United States Patent [19]

Farwer et al.

[11] 4,091,189

[45] May 23, 1978

[54] LIQUID-TIGHT SEAL FOR STORAGE BATTERIES

[75] Inventors: Alfward Farwer, Stelingen; Wolfgang Kujawa, Garbsen; Klaus Schulze, Wettbergen, all of Germany

[73] Assignee: Varta Batterie Aktiengesellschaft, Germany

[21] Appl. No.: 694,472

[22] Filed: Jun. 9, 1976

[30] Foreign Application Priority Data

Jun. 25, 1975 Germany .............................. 2528263

[51] Int. Cl.² .......................................... H01M 2/08
[52] U.S. Cl. .................................................... 429/181
[58] Field of Search ............... 429/184, 160, 180, 181; 148/25; 264/39; 156/307, 308, 309

[56] References Cited

U.S. PATENT DOCUMENTS

| 2,575,076 | 11/1951 | Smyth | 429/178 |
| 2,781,414 | 2/1957 | Ensign et al. | 429/184 |
| 2,838,437 | 6/1958 | Busse et al. | 156/308 |
| 3,065,538 | 11/1962 | Melchiors | 148/25 |
| 3,340,099 | 9/1967 | Sherfey | 429/184 |
| 3,833,458 | 9/1974 | Bierman et al. | 156/309 |

*Primary Examiner*—Donald L. Walton
*Attorney, Agent, or Firm*—Weiser, Stapler & Spivak

[57] ABSTRACT

Metallic lead-throughs of batteries are coated with resin having carboxyl radicals. The resulting product and the method of producing it.

2 Claims, No Drawings

LIQUID-TIGHT SEAL FOR STORAGE BATTERIES

This invention relates to liquid-tight metal lead-throughs for electric storage batteries.

In electric storage batteries it is necessary to provide liquid-tight lead-throughs, particularly for the terminal posts and cell connectors. Liquid electrolyte which escapes from the battery case in the vicinity of the terminal lead-throughs causes chemical changes in the surface of the terminals. This intolerably increases the junction resistance of the terminal posts.

It is, however, difficult to avoid leaks in the vicinity of the terminal lead-throughs and cell connectors. In the vicinity of the terminal lead-throughs and cell connectors, materials of different characteristics meet, and the synthetic plastic of which the case is formed adheres inadequately to the metallic terminal lead-throughs. Differences in thermal expansion coefficients and coefficients of elasticity also lead to loss of liquid tightness in the vicinity of the terminal lead-throughs.

Additional sealing means have therefore been employed in an effort to protect terminal lead-throughs or cell connectors better against electrolyte escape. For example, as more fully set forth in German Pat. No. 1,213,904, there is known a sealing arrangement for the terminal lead-throughs of electric storage batteries in which the terminal shaft is coated with a solution of bitumen, synthetic material, or adhesive which is vinyl based, or with a mixture of the foregoing. The synthetic plastic battery case can be injection molded around the terminal posts wich have previously been prepared as described above.

U.S. Pat. No. 2,575,076 also discloses a sealing mass for terminal lead-throughs. In this instance, a mixture of a polyvinyl resin and phtalates is applied to the pole bolt.

However, adhesion of this known sealing mass to the pole bolt is inadequate. The responsibility for this lies with the thin oxide coating on the surface of the metal. This oxide coating causes such things as cracks and inadequate adhesion to the sealing mass, thereby providing leakage paths for the electrolyte. Sealing materials of the type described above are therefore unsatisfactory, in that they are unreliable and lose their effectiveness during the life of the storage battery.

Accordingly, it is an object of the present invention to provide liquid-tight metal lead-throughs for electric storage batteries which are reliable and of lasting effectiveness.

It is another object to provide such sealing means which may be applied to the terminal lead-throughs and cell connectors and their metal parts in a simple manner and preferably also by automatic machinery.

These and other objects which will appear are achieved in accordance with the invention by providing the lead-through in the region in which the seal is to be effected with a coating which comprises primarily a resin having carboxyl radicals.

To produce liquid-tight metal lead-throughs, there is applied to the pole bolts, pole receptacles and cell connectors, a solution of a resin with carboxyl radicals in accordance with the invention. This solution may be applied with a brush or may be sprayed on. This also makes it possible to integrate this procedure into an automatic manufacturing process.

It is known that very many metals, and particularly lead, are coated with a thin oxide layer. The resins with carboxyl radical dissolve this oxide layer so that there arises direct contact between the metal and the resin. After the solvent had dried, the metallic lead-through is coated with a continuous resin layer. Due to the direct contact with the metal, this layer adheres tightly to that metal. Since the oxide layer has been dissolved without residue, no leakage path exists for the electrolyte.

Since resins have a strong affinity for polyolefins, metallic lead-throughs which have been so treated are particularly suitable for use with cases of polypropylene. To assure sealing of the built-in pole bolts, pole receptacles, or cell connectors, the propylene may, for example, be molded around the metal parts which have previously been treated in accordance with the invention. Thus, the entire lid may be placed around the pole bolts or pole receptacles through injection molding. In so doing, the surface of the resin layer dissolves in the liquid polypropylene. After cooling and setting of the polypropylene, the metal lead-throughs are tightly anchored and sealed in the lid. Resins with carboxyl radicals are characterized by a strong affinity for metals and synthetic plastics, because their molecules contain both polar and non-polar groups. These resins, therefore, provide good adhesives for joining the metal lead-throughs and the synthetic plastic, particularly polypropylene.

As the resin with carboxyl radicals, colophony is particularly suitable. As solvents, ethyl alcohol, toluol, or trichlorethylene may be used, for example. The solutions should be between about 2 and 20 percent by weight, and preferably between about 5 and 7.5 by weight of colophony. The layers of dry colophony material on the metal should have thicknesses between about 1 micron and 10 microns, and preferably between about 3 microns and 8 microns.

Other suitable materials with carboxyl radicals are abietic acid (the pure substance which can be isolated from colophony as its principal ingredient), polyacrylic acid, and natural resins such as Dammara resins and Copal resins.

Metal lead-throughs which had been sealed in accordance with the invention showed, in contrast to conventional terminal lead-throughs, no electrolyte escape even after several months' storage.

In lead storage batteries which are subjected to very heavy heat loads, as for example, by withdrawal of high currents or through storage at high temperatures, differences in heat expansion coefficients between the metal lead-throughs and the synthetic plastic case can cause leakage. In such cases, use of a special elastic sealing material is advisable. Such a material must have rubber-like elastic properties even at high temperatures.

Reliable sealing of metallic lead-throughs under heat loads can be achieved in accordance with the invention by applying a mixture of colophony and a rubber-like elastic material. In principle, any rubber-like elastic substance may be used. These may themselves have carboxyl radicals, e.g. polyvinyl acetate or copolymers of ethylene and vinyl acetate. A solution of about 2 to about 20 percent by weight of colophony and about 1 to about 6 percent by weight of polyvinyl acetate in ethanol is suitable. Preferably, about 8 to 12 percent by weight of colophony and about 3 to 5 percent by weight of polyvinyl acetate are used. Also suitable is a solution in toluol of about 2 to 20 percent by weight colophony and about 1 to 6 percent by weight of a vinyl acetate-ethylene copolymer and having preferably about 40 to 45 percent vinyl acetate content. Preferably, about 8 to 12 percent colophony and about 3 to 5 percent by weight of the copolymer are used.

However, a material without carboxyl radicals may also be used as the rubber-like elastic component. Preferably polyisobutylene is used in that case. Such mixtures of colophony and polyisobutylene exhibit very good temperature stability with respect to their rubber-like elastic properties. The mixture can be readily utilized in automatically functioning machines as a solution in toluol, for example, by dipping, spraying, or brushing.

Solutions having high colophony and relatively low polyisobutylene content exhibit good creeping or spreading properties on lead and therefore spread, even across the underside of horizontally positioned lead surfaces. They are therefore suitable for the coating of surfaces which are difficult to reach, e.g. in cell connectors. Preferable are solutions with about 10 to 50 percent by weight colophony and about 0.1 to 5 percent by weight polyisobutylene, and particularly preferred are those with about 30 to 50 percent colophony and about 0.5 to 2 percent by weight polyisobutylene in a solvent, especially toluol.

For coating of readily accessable surfaces, e.g. for the coating of terminal recepticles, solutions having a higher polyisobutylene content may also be used in which the colophony content is correspondingly reduced. For this purpose, solutions with contents of about 2 to 10 percent by weight colophony and about 2 to 10 percent polyisobutylene may be used and preferably those of about 4 to 8 percent by weight colophony and about 4 to 8 percent polyisobutylene.

For automatic application as, for example, to cell connectors, the following apparatus may be used.

Before molding the cell connectors in synthetic material, particularly in polypropylene, the batteries move along a conveyor until each one abuts against a projecting contact, where it is stopped. Contact with this projection also actuates a switch which in turn opens a pneumatic valve which, acting via an activating cylinder, lifts a metal plate for, say, one second and then lets it return to its rest position. This metal plate, in turn is connected to the shafts of as many plunger-activated dosing pumps as there are cell connectors on the battery. Lifting of the metal plate causes the solution used for coating to be propelled through the pumps, whence it is expelled through hoses whose outlets are so positioned that the solution is sprayed onto the respective cell connectors.

Sealing means in accordance with the invention are characterized by very high affinity to metals and to synthetic plastics. They exhibit good rubber-like elastic properties and are resistant to change over wide temperature ranges. They are especially suitable for storage batteries with metallic lead-throughs of lead and a housing of polypropylene.

We claim:

1. An electric storage battery having a synthetic plastic case and a liquid-tight metal lead-through, comprising a coating on the lead-through in the region in which the liquid tightness is to prevail, the coating consisting of a mixture of colophony and polyisobutylene, and the manufacture of the battery including the steps of applying the mixture in solution in a solvent to the metal lead-through in the said region, thereby dissolving oxide coating on the metal, allowing the solvent to dry thereby leaving a coating of the mixture on the deoxidized metal, and applying the plastic of the case around the metal with its mixture coating.

2. The lead-through of claim 1 characterized in that the coating has a thickness of about 3 to 8 microns.

* * * * *